(12) United States Patent
Burton et al.

(10) Patent No.: US 9,236,086 B1
(45) Date of Patent: Jan. 12, 2016

(54) METHODS FOR REDUCING OPERATIONAL LATENCY OF DATA STORAGE SYSTEMS

(71) Applicant: Western Digital Technologies, Inc., Irvine, CA (US)

(72) Inventors: Scott Burton, Westminster, CO (US); Asif F. Gosla, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/514,689

(22) Filed: Oct. 15, 2014

(51) Int. Cl.
*G11B 15/18* (2006.01)
*G11B 20/18* (2006.01)
*G11B 5/09* (2006.01)
*G11B 20/12* (2006.01)

(52) U.S. Cl.
CPC .............. *G11B 20/1889* (2013.01); *G11B 5/09* (2013.01); *G11B 20/1217* (2013.01); *G11B 2020/1232* (2013.01)

(58) Field of Classification Search
None
See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |
| 6,327,106 B1 | 12/2001 | Rothberg | |
| 6,337,778 B1 | 1/2002 | Gagne | |

(Continued)

OTHER PUBLICATIONS

James N. Malina, et al., U.S. Appl. No. 13/662,353, filed Oct. 26, 2012, 42 pages.

*Primary Examiner* — K. Wong

(57) ABSTRACT

Systems and methods for reducing operational latency of data storage systems are disclosed. More particularly, a data storage device can perform conditioning operations on inactive zones while the data storage device is idle. When an active zone is the target of a write command, the data storage device can exchange a conditioned inactive zone for the unconditioned target zone. The write operation can be performed immediately on the previously-inactive already-conditioned zone. At a later time, the target zone can be conditioned.

20 Claims, 7 Drawing Sheets

(56) References Cited

U.S. PATENT DOCUMENTS

| | | |
|---|---|---|
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,007 B2 | 7/2006 | Liu et al. |

(56) References Cited

U.S. PATENT DOCUMENTS

| | | |
|---|---|---|
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |

(56) References Cited

U.S. PATENT DOCUMENTS

| | | |
|---|---|---|
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 * | 4/2014 | Malina .......................... 360/31 |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2007/0174582 A1 | 7/2007 | Feldman |
| 2009/0113702 A1 | 5/2009 | Hogg |
| 2010/0205623 A1 | 8/2010 | Molaro et al. |
| 2010/0306551 A1 | 12/2010 | Meyer et al. |
| 2011/0197035 A1 | 8/2011 | Na et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0242425 A1 * | 9/2013 | Zayas et al. ................... 360/15 |
| 2014/0201424 A1 | 7/2014 | Chen et al. |

\* cited by examiner

METHODS FOR REDUCING OPERATIONAL LATENCY OF DATA STORAGE SYSTEMS

TECHNICAL FIELD

This disclosure relates to information storage and, more particularly, to systems and methods for reducing operational latency of data storage systems.

BACKGROUND

Many computing systems generate or receive data that may be desirable to store persistently. These computing systems often utilize a data storage device, such as a hard disk drive ("HDD"), for data storage and retrieval. In many cases, a HDD can include a circular recording disk made from a magnetic material onto (and/or into) which data can be recorded as patterns of magnetic polarity. A write head of the HDD can write data to the recording disk in response to a write instruction, and a read head can retrieve data from the recording disk in response to a read instruction.

A HDD may perform certain tasks upon each read or write instruction as a result of a particular magnetic recording implementation. For one example, a data storage device can implement shingled magnetic recording ("SMR") to increase the data density of the recording disk. For example, an SMR data storage device can write data in tracks that partially overlap radially and/or circumferentially. Accordingly, in part as a result of the overlap of SMR tracks, an SMR data storage device can overwrite data tracks adjacent to the written data track during a write operation. Accordingly, many SMR data storage devices write data sequentially, and data may be organized into to one or more zones.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

The use of the same or similar reference numerals in different drawings indicates similar, related, or identical items where appropriate.

DETAILED DESCRIPTION

Figure 1:
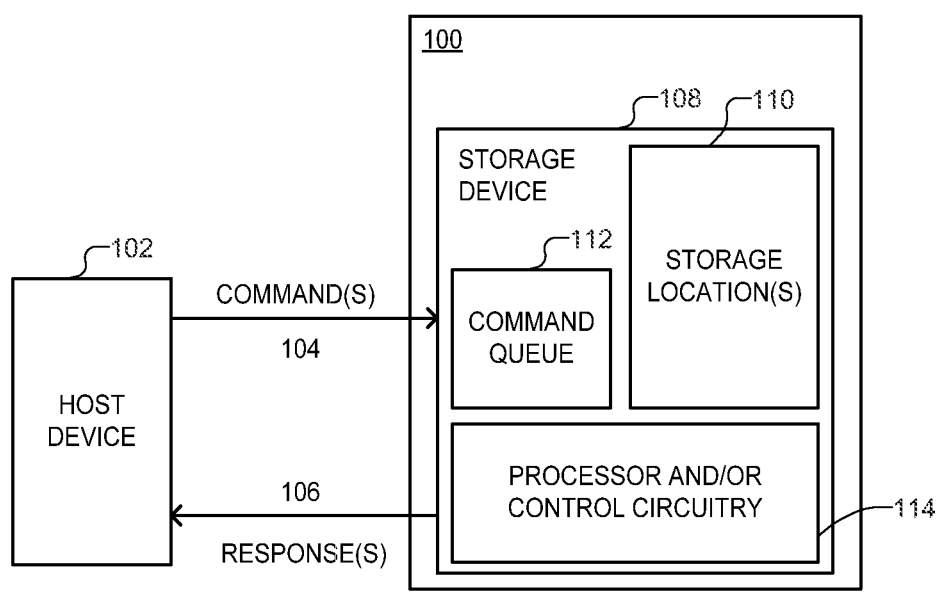
FIG. 1 depicts a simplified block diagram of an example data storage system that may be configured to perform one or more maintenance and/or conditioning operations prior to writing.

Embodiments described herein relate to systems and methods for decreasing the operational latency of data storage systems implementing shingled magnetic recording, although the various systems and methods described herein are not limited to particular form factors and can apply equally to magnetic or non-magnetic data storage system types. Further, it should be appreciated that the various embodiments described herein, as well as functionality, operation, components, and capabilities thereof may be combined with other elements as necessary, and so any physical, functional, or operational discussion of any element or feature is not intended to be limited solely to a particular embodiment to the exclusion of others.

Many embodiments described herein take the form of a data storage system that performs various maintenance operations to physical sections of a magnetic recording disk. A variety of maintenance operations (such as block, zone, and/or sector conditioning, managing relocation lists, facilitating discovery of write pointer locations, etc.) can be performed as initialization operations (for example on power up) to minimize writing to physically defective sectors. For example, in certain embodiments, a zone conditioning operation can include writing a particular pattern to one or more blocks within a particular zone of the data storage system. Thereafter, the pattern may be read back by the data storage system. The written and read patterns can be compared to determine whether the data was written correctly. In the event that the patterns do not match, the data storage system may attempt to write the pattern again. If the patterns do not match for subsequent write/read comparisons, the data storage system can conclude that a physical defect is present. The data storage system can note the location of the physical defect so as to avoid writing to that location during future write operations.

In other examples, a zone conditioning operation can include writing a known pattern or applying a known signal one or more times to one or more blocks of a particular zone so as to normalize the magnetic polarity of the various blocks within the zone. For example, an alternating current signal ("AC") can be applied at a particular frequency to various blocks of a selected zone as a write operation. In this manner, the operation can have the effect of securely erasing old data before new data is written. Accordingly, the conditioning operation of applying an AC signal at a selected frequency to erase one or more blocks of a particular zone is referred to herein as an "AC erase" operation.

In still further examples, a zone conditioning operation can include reading data currently stored within a zone. For one example, as noted above, a data storage device can implement SMR to increase the data density of the recording disk. Upon receiving a write instruction to a specific zone, an SMR data storage device may condition the zone by first reading the entire zone (or a portion of the zone) into a separate memory location such as a data buffer. In this manner, the data stored within the zone is not lost as a result of the SMR write operation.

In still further examples, a zone conditioning operation can include determining a safe write location within the data storage system as an initialization operation performed on power up. For example, certain data storage systems may only write data sequentially (e.g., SMR data storage systems). In such systems, a non-volatile memory within the data storage system can maintain a table or database of pointers to safe write locations. For example, the non-volatile memory can store a pointer to the last block that contains data within a particular zone. In this manner, when the data storage system next receives an instruction to write to that zone, the non-volatile memory can be queried to retrieve the appropriate write pointer. Thereafter, the data storage system can write data sequentially from the retrieved write pointer. Once the data write operation is complete, the non-volatile memory can be updated to include a new write pointer for the particular zone.

However, in certain cases, a write pointer may not be properly updated. For example, if the data storage device loses power during a write operation, the non-volatile memory may not be updated. In such examples, if the data storage system attempts to write to a zone based on the write pointer retrieved from the non-volatile memory, data can be overwritten and permanently lost. Accordingly, certain sequential data system embodiments described herein, including SMR data storage systems, can include a conditioning operation to facilitate the discovery and/or verification of the location of a write pointer within a particular zone when the data storage device powers up after a power loss. In one embodiment, the conditioning operation can include reading data from that zone until a block is encountered that does not contain data.

Furthermore, in some cases, a sequential data system can receive a write-pointer reset command for a particular zone. In response to the write pointer reset command, the sequential data system can set that zone's write pointer back to the first block of the zone. In these examples the sequential data system may perform one or more conditioning operations prior to writing data at the newly-reset write pointer in order to, for example, discover defects on the magnetic recording disk, write a known pattern to facilitate discovery of write pointer locations, perform an AC erase operation, and so on.

However, although zone conditioning may improve the reliability of certain data storage systems (e.g., AC erase, facilitation of write pointer discovery, and so on), such conditioning operations typically are high latency operations. In other words, although data may be more reliably stored as a result of conditioning, the time required to condition a zone and then write to the zone may be undesirable for certain data storage devices.

Accordingly, embodiments described herein relate to systems and methods for reducing operational latency of data storage systems that may be configured to perform one or more maintenance and/or conditioning operations.

For example, many embodiments include a data storage system having an inactive zone configured to be substituted for an active zone upon receiving an instruction from a host device (such as a computing system) to reset of the write pointer of the active zone. In these examples, the inactive zone may already be conditioned for writing data. In this manner, once the inactive zone is substituted for the active zone, write operations can be performed on the previously-inactive and already-conditioned zone immediately. Sometime later, for example while the data storage system is idle, one or more conditioning operations can be performed on the previously-active zone, as a background task for example. In this manner, from the perspective of the host device, write operations following write pointer reset commands occur immediately whereas conditioning operations occur in a manner that is transparent to the host device. In an alternative non-limiting phrasing, the data storage system of certain embodiments accelerates the performance of write operations by delaying the performance of conditioning operations.

In some embodiments, a data storage system can be implemented with a plurality of auxiliary zones. For example, a data storage system can include a magnetic recording disk divided into ten writeable zones. These zones can be organized into six 'active' zones and four auxiliary 'inactive' zones. When the data storage system receives a write pointer reset instruction to one of the six active zones, the data storage system can substitute one of the four inactive zones with the active zone to be written. Thereafter, the status of the substituted zones can be toggled; the previously-inactive zone can be set to an 'active' status and the previously-active zone can be set to an 'inactive' status.

In many examples, each zone of a data storage system can be associated with a unique address. In some embodiments, the address for a particular zone can be implemented as a pointer to a particular physical location along a magnetic recording disk. In these embodiments, the operation of substituting an active zone with an inactive zone can be performed by substituting the addresses and/or pointer of each respective zone.

Continuing the ten-zone example presented above, the data storage system can internally address the ten zones as zones 1-10. The six active zones can be reported to the host device as writable zones A-F. For example, if zones 1-6 are 'active' and zones 7-10 are 'inactive', the data storage system can associate the address of zone 1 with zone A, the address of zone 2 with zone B, and so on. In this manner, if the host device provides an instruction to read data from zone A, the data storage system can read from zone 1, if the host device provides an instruction to read data from zone B, the data storage system can read from zone 2, and so on.

Accordingly, for many embodiments described herein, when the host device provides an instruction to write to zone A, the data storage system can replace the address of zone 1 with the address of an inactive zone such as, in this example, zone 7. Thereafter, the data storage system can write to zone 7 in response to the write instruction to zone A. Next, the data storage system can report to the host device that the write operation to zone A is commenced. As a result of this operation, zone 7 may be set to 'active' status and zone 1 may be set to 'inactive' status. In this manner, if the host device subsequently provides an instruction to read data from zone A, the data storage system can read from zone 7.

In certain some embodiments, a data storage system can have a number of inactive zones organized as a queue. When idle, the data storage system can perform conditioning operations on the inactive zones within the queue. In one example, the data storage system can condition the inactive zones in a first-in-first-out order. In these embodiments, when the data storage system receives a write instruction to an active zone, the active zone can be pushed onto the inactive zone queue while an inactive zone (that is already conditioned) can be popped from the inactive zone queue and substituted for the previously-active zone. The data storage system can thereafter perform the write operation to the previously-inactive zone. In still further examples, more than one zone queue can be used.

In some embodiments, the number of active and inactive zones can vary. For example, one may appreciate that the greater the number of inactive zones, the faster data may be written. In other words, continuing the example above, if a host device submits an instruction to write data to zones A-E, an implementation with at least five 'inactive' zones may be suited to execute the five write operations faster than an implementation with only four 'inactive' zones. In other words, the implementation with four 'inactive' zones may need to condition one zone prior to writing zone E.

In further embodiments, the number of active and inactive zones can dynamically vary based on one or more parameters. For example, a data storage system storing a small amount of data may set a larger number of zones 'inactive' than a data storage system storing a large amount of data. As the data storage system stores more and more data, it may dynamically reduce the number of 'inactive' zones. In other words, certain data storage systems can set the number of 'inactive' zones based on the amount of data stored within the data storage system.

In some embodiments, a data storage system can set the number of 'inactive' zones based on a measured, predicted, estimated, or determined write throughput. For example, if a large amount of data is expected to be written, the data storage system may increase the number of 'inactive' zones. In another example, if a small amount of data is expected to be written, the data storage system may decrease the number of inactive zones.

In some embodiments, a host device can set or influence the number of active and inactive zones.

FIG. 1 depicts a simplified block diagram of an example data storage system that may be configured to perform one or more maintenance and/or conditioning operations. The data storage system 100 can be configured to communicate with a host device 102. The host device 102 may be any suitable electronic device such as a laptop computer, desktop computer, server, cellular phone, tablet computer, and so on. In some embodiments, the host device 102 can be implemented as a system of individual electronic devices, for example, as a network of servers.

The host device 102 can send commands 104 to the data storage system 100. The commands 104 can be any number of suitable commands including, but not necessarily limited to, write commands, erase commands, and read commands. Upon receiving a command 104, the data storage system 100 may return a response 106. For one example, if the host device 102 sends a read command 104 the data storage system 100 can send a response 106 including the requested data.

The data storage system 100 can include a storage device 108. In many examples, the storage device 108 can implement SMR within a storage location 110. For example, the storage location 110 can include one or more circular recording disks made from a magnetic material onto (and/or into) which data can be recorded as patterns of magnetic polarity.

A write head (not shown) of the storage device 108 can write data to specific regions (or zones) of the recording disk in response to a write instruction from the host device 102, and a read head (not shown) can retrieve data from the storage device 108 in response to a read instruction from the host device 102. In an SMR implementation, independent zones can be separated by guard bands of a particular size.

The storage device 108 can also include a memory for storing commands 104. For example, in certain embodiments, the storage device 108 may include a command queue 112. The command queue 112 can receive commands 104 from the host device 102 and can execute the commands in a first-in-first-out order.

The storage device 108 can also include control circuitry 114. The control circuitry 114 can be implemented as a controller, an electrical circuit, an integrated circuit, or as instructions executed by a processor associated with the storage device 108 or the data storage system 100. In many embodiments, the control circuitry 114 can perform or coordinate one or more operations of the storage device 108 and/or data storage system 100. For example, the control circuitry 114 can control the read and write head of the storage location 110, can control the command queue 112, and can send the responses 106 to the host device 102.

In some embodiments, the control circuitry 114 can perform additional or fewer functions. For example, in certain embodiments, the control circuitry 114 can control the number of zones within the storage location 110 that are active and inactive.

Figure 2:
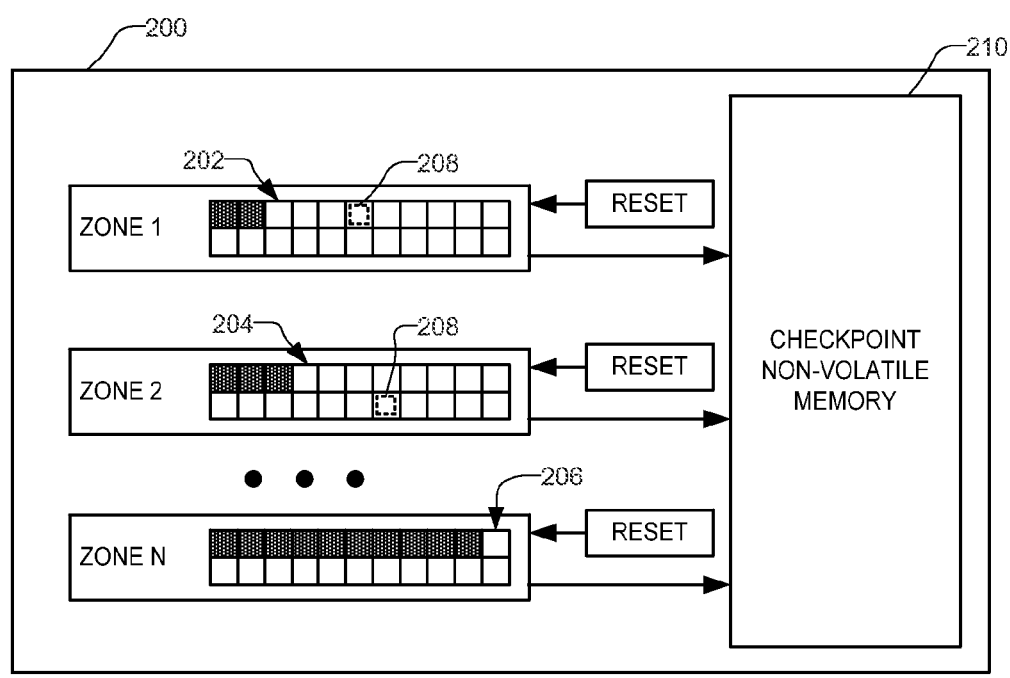
FIG. 2 depicts a simplified block diagram of an example SMR data storage system implementing multiple zones separated by guard bands.

FIG. 2 depicts a simplified block diagram of an example SMR data storage system 200 implementing multiple zones separated by guard bands, such as may be implemented by the storage location 110 of FIG. 1. The SMR data storage system can be divided into N number of equally sized zones, each physically separated by a guard band. The size of the N zones and the size of the respective guard bands may vary from embodiment to embodiment. As illustrated each of the N zones is defined by twenty-two blocks to which data can be written.

The SMR data storage system 200 can also include a non-volatile memory 210 that can store information related to the N zones. For example, the non-volatile memory 210 can store a write pointer for each zone. In one embodiment, a write pointer can be a physical location within a particular zone that indicates a safe write location for subsequent write commands. For example, as noted above, an SMR system may be configured to write data sequentially. In many cases, a single write command may not write enough data to fill the entire zone. For example, as illustrated, ZONE 1 can be defined by twenty-two distinct blocks of data. As shown, only two of the twenty-two available blocks contain data (illustrated as shaded regions). Accordingly, the non-volatile memory 210 can store a write pointer 202 to record that the third block of ZONE 1 is the block from which subsequent write operations should begin. Similarly, ZONE 2 is illustrated containing three blocks of written data (illustrated as shaded regions). The write pointer 204 associated with ZONE 2 references the fourth block as the block from which subsequent write operations should begin. In addition, ZONE N is illustrated containing ten blocks of written data (illustrated as shaded regions). The write pointer 206 associated with ZONE N references the eleventh block as the block from which subsequent write operations may begin.

In addition, each individual zone can be configured to receive a write pointer reset command. As may be appreciated, resetting the write pointer of a particular zone to the beginning of the zone has the effect of erasing the data contained within the zone.

In many embodiments, an SMR data storage system 200 can perform one or more conditioning operations upon receiving or issuing a write pointer reset command for a particular zone. As noted above, the SMR data storage system 200 can physically inspect the zone to determine whether the zone has a defect 208. For example, in certain embodiments and as noted above, a zone conditioning operation can include writing a particular pattern to one or more blocks within the selected zone. Thereafter, the pattern may be read back by the data storage system. The written and read patterns can be compared to determine whether the data was written correctly. In the event that the patterns do not match, the SMR data storage system 200 can store the detected defect 208 in the non-volatile memory 210, so as to avoid writing to that location during future write operations.

In many cases, the written pattern can be used to facilitate discovery of the current write pointer of the SMR data storage system 200. For example, in the case of power loss, the SMR data storage system 200 can read data from a particular zone or block and monitor for the known pattern that was previously written. Upon discovery of the location of the known pattern, the SMR data storage system 200 can update the write pointer associated with that zone to the location of the known pattern.

In other examples, other conditioning and/or maintenance operations can be performed. For example, some conditioning operations can determine whether a particular block or set of blocks or sectors within a particular block have failed. In these embodiments, the location of such failed blocks and/or sectors can be recorded such that the SMR data storage system 200 can prevent writing to the failed blocks during future write operations.

Figure 3A:
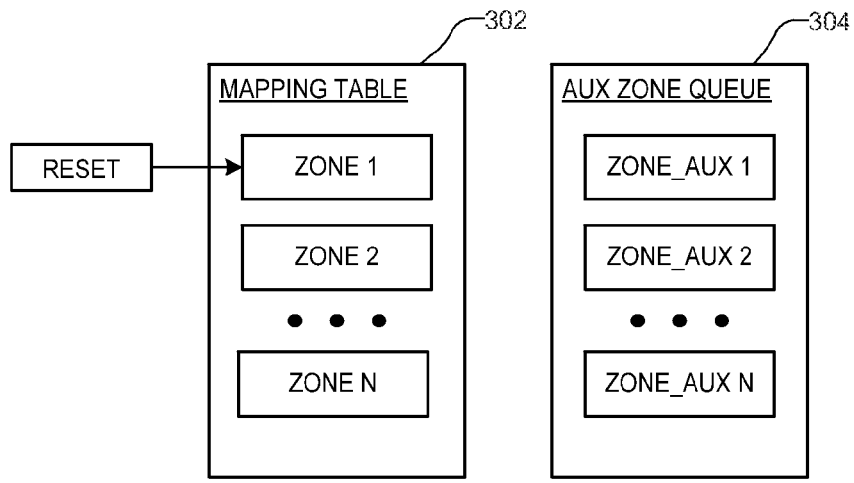
FIG. 3A depicts a simplified block diagram of an example SMR data storage system implemented with auxiliary zones.

FIG. 3A depicts a simplified block diagram of an example SMR data storage system implemented with a plurality of auxiliary zones. The SMR data storage system can include a magnetic recording disk divided into 2N writeable zones. These zones can be organized into several 'active' zones and several auxiliary 'inactive' zones.

The SMR data storage system can include a mapping table 302 that stores pointers for all active zones. As illustrated, the mapping table 302 can include pointers to ZONE 1-ZONE N. Similarly, an auxiliary zone queue 304 can store pointers for all inactive zones. As illustrated, the auxiliary zone queue 304 can include pointers to ZONE_AUX 1-ZONE_AUX N. In the illustrated embodiment, the SMR data storage system includes 2N zones; one half of the zones are active and referenced within the mapping table 302 and one half of the zones are inactive and referenced within the auxiliary zone queue 304.

When the SMR data storage system receives a write instruction to one of the active zones, the SMR data storage system can substitute one of the inactive zones with the active zone to be written. Thereafter, the status of the substituted zones can be toggled; the previously-inactive zone can be set to an 'active' status and the previously-active zone can be set to an 'inactive' status.

Figure 3B:
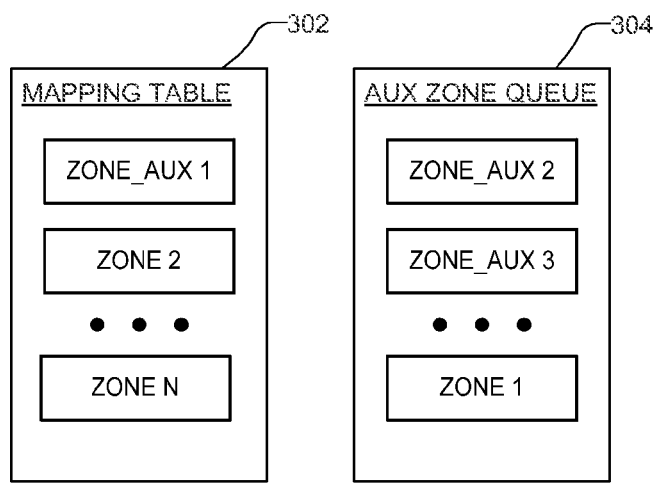
FIG. 3B depicts the example SMR data storage system of FIG. 3A after the data storage system receives a write pointer reset instruction.

For example, as shown in FIG. 3B, if ZONE 1 receives a write instruction (e.g., write pointer reset command in FIG. 3A), an auxiliary zone that is inactive, such as ZONE_AUX 1, can be selected to replace ZONE 1 within the mapping table 302. Thereafter, ZONE 1 may be moved to the bottom of the auxiliary zone queue 304. Next, the SMR data storage system can perform conditioning operations, such as those described herein, on the inactive zones within the auxiliary zone queue 304. More particularly, the SMR data storage system can perform conditioning operations on ZONE 1.

Figure 3C:
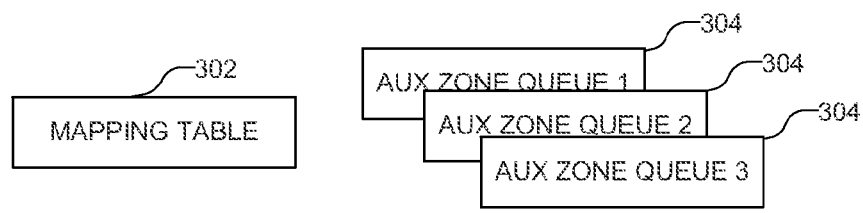
FIG. 3C depicts a simplified block diagram of an example SMR data storage system implemented with multiple auxiliary zone queues.

In still further embodiments, such as the embodiment depicted in FIG. 3C, more than one auxiliary zone queue can be used.

Figure 4:
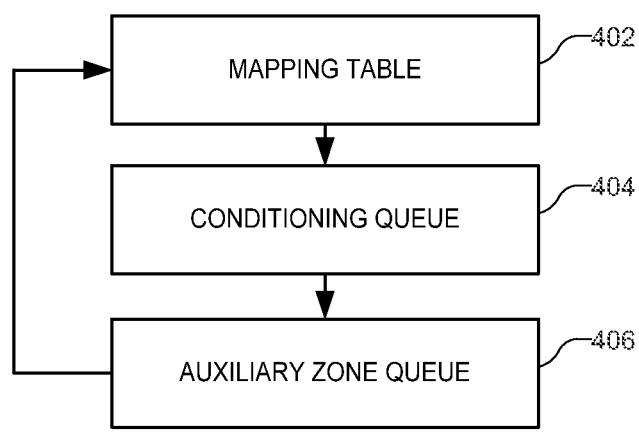
FIG. 4 depicts a flow chart of sample operations of a method of operating an SMR data storage system implemented with auxiliary zones.

FIG. 4 depicts a flow chart of sample operations of a method of operating an SMR data storage system implemented with an auxiliary zone queue and a processing queue. A selected zone may be a member of mapping table of active zones at operation 402. Thereafter, the SMR data storage system can set the selected zone to an inactive state and can pass the selected zone into a conditioning queue at operation 404. In many examples, the SMR data storage system may pass the selected zone to the conditioning queue in response to a write instruction (e.g., write pointer reset command). In many examples, conditioning of the selected zone can take place while the SMR data storage system is idle.

Next, after the selected zone is conditioned within the conditioning queue, it can be passed to the auxiliary zone queue at operation 406. At a later point, the selected zone can replace a second selected zone within the mapping table at 402, by returning to active status.

Figure 5:
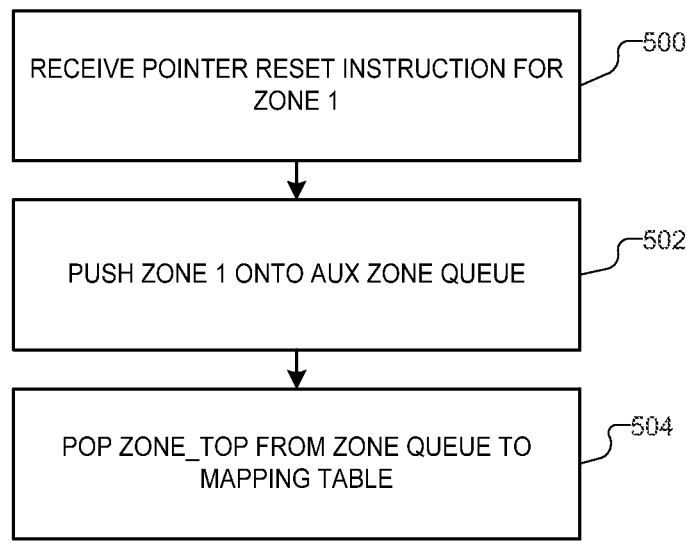
FIG. 5 depicts a flow chart of sample operations of another method of operating an SMR data storage system implemented with auxiliary zones.

FIG. 5 depicts a flow chart of sample operations of another method of operating an SMR data storage system implemented with auxiliary zones. The method can begin at operation 500 at which a write pointer reset instruction is received for ZONE 1 while the zone is in the active state (e.g., referenced by a mapping table).

Next, ZONE 1 can be set to an inactive state and can be pushed into an auxiliary zone queue at operation 502. As with some embodiments described herein, one or more conditioning and/or maintenance operations can be performed on ZONE 1, when the zone is in the auxiliary zone queue.

Next, ZONE_TOP can be popped from the auxiliary zone cue at operation 504. Once popped from the auxiliary zone queue, ZONE_TOP can be set to the active state and added to the mapping table.

Figure 6:
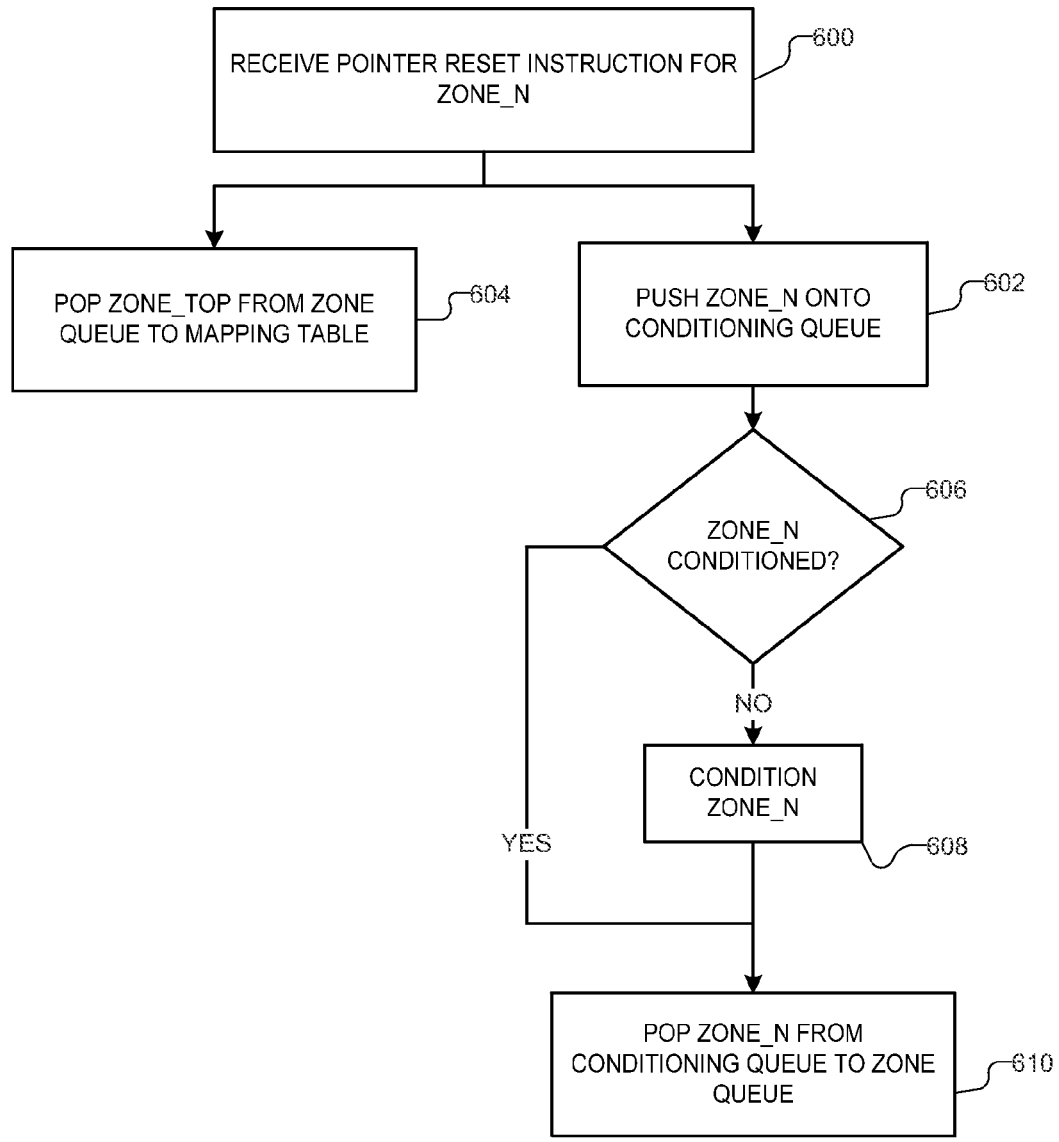
FIG. 6 depicts a flow chart of sample operations of another method of operating an SMR data storage system implemented with auxiliary zones.

FIG. 6 depicts a flow chart of sample operations of yet another method of operating an SMR data storage system implemented with auxiliary zones. The method can begin at operation 600 in which a write pointer reset command is received for a particular active zone. The selected zone may be set to an inactive state and can be passed immediately to a conditioning queue at 602. Once in the conditioning queue, an inactive zone from the zone queue can be popped and added to the mapping table in the place of the selected zone at operation 604.

Returning to the selected zone within the conditioning queue, the method may detect whether the selected zone is conditioned at 606. If the zone is not conditioned (or needs to be conditioned and has yet to be conditioned), the method can continue to operation 608 during which the zone can be conditioned. However, if the zone is already conditioned (or does not need to be conditioned), the method can continue to operation 610 during which the zone is popped from the conditioning queue onto the zone queue.

In this manner, all members of the zone queue are fully conditioned prior to being added back to the mapping table at operation 604.

Figure 7A:
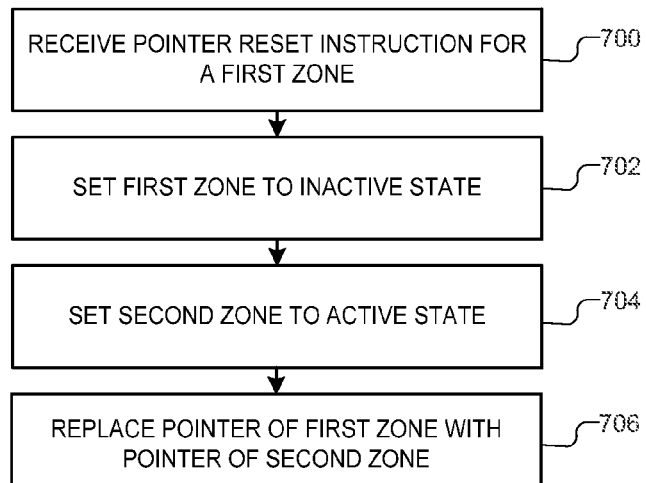
FIG. 7A-7B depicts a flow chart of sample operations of another method of operating an SMR data storage system implemented with auxiliary zones.
Figure 7B:
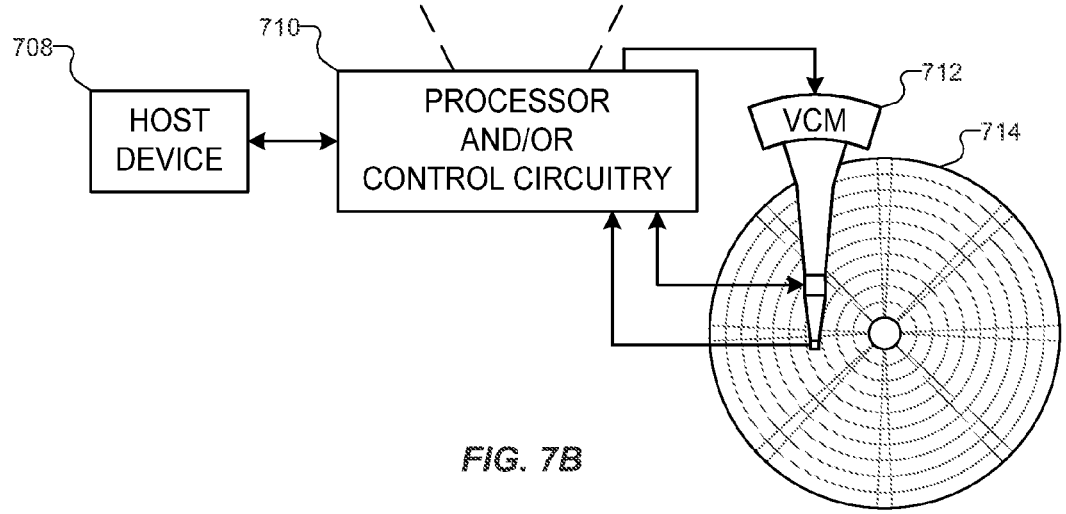

FIG. 7A-7B depicts a flow chart of sample operations of another method of operating an SMR data storage system implemented with auxiliary zones. The method of FIG. 7A can begin at operation 700 at which a write pointer reset command is received for a first zone. Next, at operation 702, the first zone is set to the inactive state. Next, at operation 704, a second zone can be set to an active state. Finally, at operation 706, the second zone may be substituted for the first zone within a mapping table associated with the SMR data storage system.

In many embodiments, the method of FIG. 7A can be implemented by an SMR data storage device, such as depicted by the simplified flow chart of FIG. 7B. As one example, the SMR data storage device can include a processor 710 that can perform or coordinate one or more of the operations of the SMR data storage device. The processor 710 can be connected to a voice coil motor 712 ("VCM") that controls the location of a read head and a write head along a rotatable disk 714 that is formed from a magnetic material. The processor 710 may also communicate with one or more host devices 708.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in some embodiments, where compatible. Likewise, the features of the different embodiments may be exchanged, substituted, or omitted where compatible and appropriate.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order, or fewer or additional steps may be required or desired for particular embodiments.

We claim:

1. A method for writing data to a data storage system, the method comprising:
   receiving a reset command for a sequential write pointer of a first zone of a plurality of active zones defined in the data storage system, the first zone associated with a first pointer;
   updating a status of a second zone not within the plurality of active zones to an active status; and
   updating a status of the first zone to an inactive status.

2. The method of claim 1, wherein the data storage system comprises a shingled magnetic recording system.

3. The method of claim 1, further comprising conditioning the first zone after updating the status of the first zone to an inactive status.

4. The method of claim 3, wherein conditioning the first zone comprises conditioning physical disk sectors.

5. The method of claim 3, wherein conditioning the first zone comprises validating media defects associated with the first zone.

6. The method of claim 3, wherein conditioning the first zone comprises managing relocation lists associated with the first zone.

7. The method of claim 3, wherein conditioning the first zone is performed with the data storage system is in an idle state.

8. The method of claim 1, further comprising:
   releasing all write-relocated sectors of the first zone;
   determining a plurality of write-relocated sectors are failing sectors; and
   preventing future writes to the failing sectors.

9. The method of claim 8, further comprising writing a known pattern to all write-relocated sectors that are not failing sectors.

10. The method of claim 1, further comprising:
    associated the first pointer with an auxiliary zone queue, the auxiliary zone queue comprising a plurality of pointers not within an active zone map;
    removing from the auxiliary zone queue, a second pointer to a second zone, the second pointer from the plurality of pointers not within the active zone map; and
    updating the zone map to replace the first pointer with the second pointer.

11. A data storage system comprising:
    a data storage device; and
    a controller configured to:
       receive a reset command for a sequential write pointer of a first zone of a plurality of active zones defined in the data storage device, the first zone associated with a first pointer;
       update a status of a second zone not within the plurality of active zones to an active status; and
       update a status of the first zone to an inactive status.

12. The data storage system of claim 11, wherein the data storage device comprises a shingled magnetic recording system.

13. The data storage system of claim 11, wherein the controller is further configured to condition the first zone after updating the status of the first zone to an inactive status.

14. The data storage system of claim 13, wherein the controller is further configured to condition the first zone by conditioning physical disk sectors.

15. The data storage system of claim 11, wherein the controller is further configured to validate media defects associated with the first zone.

16. The data storage system of claim 11, wherein the controller is further configured to manage relocation lists associated with the first zone.

17. The data storage system of claim 11, wherein conditioning the first zone is performed with the data storage system is in an idle state.

18. The data storage system of claim 11, wherein the controller is further configured to:
    release all write-relocated sectors of the first zone;
    determine a plurality of write-relocated sectors are failing sectors; and
    prevent future writes to the failing sectors.

19. The data storage system of claim 18, further comprising writing a known pattern to all write-relocated sectors that are not failing sectors.

20. A controller for managing a data storage device associated with a data storage system, the controller configured to:
    receive a reset command for a sequential write pointer of a first zone of a plurality of active zones defined in the data storage device, the first zone associated with a first pointer;
    update a status of a second zone not within the plurality of active zones to an active status; and
    update a status of the first zone to an inactive status.

* * * * *